United States Patent [19]

Dolza

[11] 4,380,444
[45] Apr. 19, 1983

[54] VARIABLE RATIO BELT DRIVE

[76] Inventor: John Dolza, 810 State Rd., Fenton, Mich. 48430

[21] Appl. No.: 257,526

[22] Filed: Apr. 27, 1981

[51] Int. Cl.³ .......................................... F16H 55/56
[52] U.S. Cl. ........................................ 474/21; 474/30
[58] Field of Search ................... 474/19, 29, 30, 37, 474/46, 21

[56] References Cited

U.S. PATENT DOCUMENTS

| 815,345 | 3/1906 | Gulowsen | 474/30 |
|---|---|---|---|
| 2,276,186 | 3/1942 | Getchell | 474/19 |
| 2,336,002 | 12/1943 | Everett | 474/29 |
| 2,577,913 | 12/1951 | Peterson | 474/29 |
| 2,651,208 | 9/1953 | Karig | 474/19 |
| 2,852,953 | 9/1958 | Karig | 474/29 X |
| 3,034,367 | 5/1962 | Steuer | 474/19 |
| 3,043,152 | 7/1962 | Karig et al. | 474/21 |
| 3,110,189 | 11/1963 | Steuer | 474/21 X |
| 3,590,649 | 7/1971 | Fischer | 474/19 |
| 3,722,308 | 3/1973 | Steuer | 474/19 |
| 3,786,688 | 1/1974 | Svenson | 474/19 |
| 3,875,814 | 4/1975 | Steuer | 474/19 |

FOREIGN PATENT DOCUMENTS

940870 11/1963 United Kingdom ................. 474/19

Primary Examiner—Allan D. Herrmann
Attorney, Agent, or Firm—Fisher, Gerhardt, Crampton & Groh

[57] ABSTRACT

A variable ratio belt drive in which a pair of pulleys each having axially movable flanges are driven by a belt and in which the ratio of the pulleys can be changed and for all ratio changes, the load between the pulley and the belt is proportional to the useful tangential force at the belt and its friction coefficient with the pulley to produce only the necessary pressure between the pulley flanges and the belt to transmit the power applied to one pulley to the other pulley. The force on the flanges of the pulleys results from control plates having opposed control surfaces of a particular configuration which are forced apart in response to the application of torque to move the pulley flanges axially toward each other with the required force. One embodiment uses a plurality of control surfaces to increase the movement of pulley flanges and thereby the maximum ratio that can be obtained. Still another embodiment of the invention uses one set of control surfaces acting during one direction of pulley rotation and another set of control surfaces acting during the opposite direction of pulley rotation to eliminate backlash problems.

29 Claims, 31 Drawing Figures

VARIABLE RATIO BELT DRIVE

This invention relates to variable ratio belt drives in which the effective or pitch radius of the pulleys is varied to change the speed while the system is in operation.

Prior art belt drives typically transmit power between pulleys by generating force on opposite sides of the belt proportional to torque. In such devices, for example, with a transmission capable of a four-to-one speed ratio, if the axial load on the belt is adequate at a minimum pulley radius, the load at the maximum radius will be over two times as large. Such loading impairs the durability and efficiency of such transmissions and makes them unsuitable for transmitting high loads and for high speeds of operation. Consequently, such devices are unsuitable for such applications as automobiles.

It is an object of the invention to provide a variable ratio belt type transmission which is capable of transmitting greater loads at higher speed ratios than heretofore possible with such transmissions by making the force applied on the sides of the belt by the pulleys proportional to the load transmitted.

Another object of the invention is to provide a variable ratio transmission in which the force is applied to the side of the belt in response to the application of torque independently of the magnitude of the torque but in proportion to the useful tangential force and coefficient of friction being transmitted by the belt.

Another object of the invention is to provide a belt drive in which for any pitch radius of the pulleys which may be selected, the force applied to the sides of the belt is proportional to the useful tangential force at the belt and its friction coefficient with the pulley.

Another object of the invention is to provide a variable ratio drive wherein ratio changes are made independently of loads being transmitted or applied.

Yet another object of the invention is provision for changing the drive ratio with very low activator power by mechanical means that substantially preserves the proportionality between the useful tangential force and the belt side load to minimize frictional losses between the belt and the pulleys.

A further object of the invention is to provide a variable ratio belt type transmission in which the axial spacing of flanges of a pulley can be varied to change the pulley ratio and in which the movement is amplified to permit high ratios.

Still another object of the invention is to provide a variable ratio belt type transmission in which the force applied to the sides of the belt by the pulleys is proportional to the tangential load by separate means depending on the direction of rotation of the pulley to thereby eliminate backlash.

A variable ratio belt drive is provided in which a pair of pulleys for such a drive each include a pair of disc-shaped flanges supported coaxially of each other for rotation as a unit and for movement axially relative to each other with the flanges having conical surfaces converging relative to each other radially inwardly and adapted to receive and engage a flexible transmission belt which is similarly engaged with the other pulley. Means are provided to act on and resiliently urge the flanges of the pulleys axially towards each other and therefore into engagement with the sides of the transmission belt with a force substantially proportional to the net tangential force and coefficient of friction between the flanges of the pulleys and the belt in all of the selected positions of the belt relative to the flanges. The means urging the flanges toward each other include plates having control surfaces facing each other which are forced apart by rolling means which serve to move the flanges of the pulleys axially relative to each other in proportion to the tangential force of the belt. The pitch of the pulleys is changed by applying a force to the flanges of a selected pulley of the drive to force the flanges axially relative to each other and thereby change the ratio of the pulley acted on which in turn results in a corresponding ratio change in the other pulley. Means also are provided to minimize the frictional loading of the axial shifting flanges of the pulleys be bearing means which may be displaced axially of the pulley during the ratio change in one position of rotation but which are returned to their normal original position when they arrive at a diametrically opposed location. Such rolling means also serve to insure that the opposed flanges of the pulleys rotate in unison with each other. In one embodiment of the invention, multiple means are provided to act on and resiliently urge the pulley flanges to provide a larger axial range of movement to thereby increase the range of ratio change. Still another embodiment of the invention provides separate means for urging the flanges of the pulleys into engagement with the belt when the pulley is rotated in one direction and separate surfaces when the pulley is rotated in an opposite direction, all to eliminate problems of backlash.

The object of the invention are accomplished by the embodiments disclosed in the following description and illustrated in the drawings in which.

Figure 1:
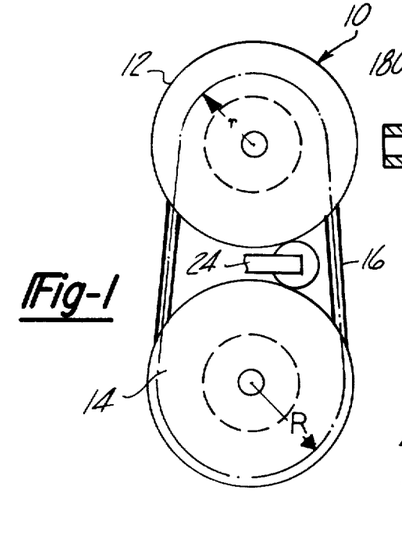
FIG. 1 is a diagrammatic view depicting the variable speed belt drive mechanism embodying the invention.
Figure 2:
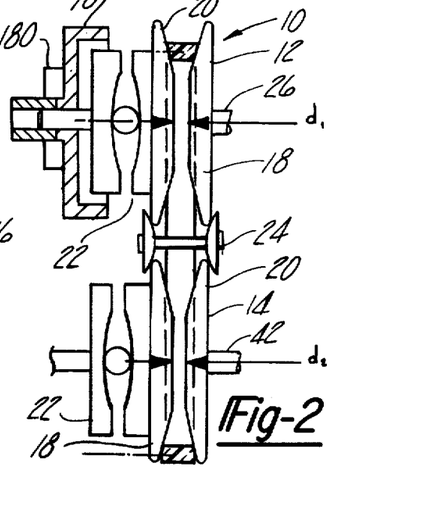
FIG. 2 is another diagrammatic view taken from one side in FIG. 1.

Referring to FIGS. 1 and 2, the variable ratio transmission embodying the invention is designated generally at 10 and includes a pair of pulley assemblies 12 and 14 supported to rotate about parallel axes and to be connected together by a transmission member or belt 16. The belt 16 can be of rubber or metal. Each of the pulleys 12 and 14 is made up of a pair of conical flanges 18 and 20 which are movable axially relative to each other for the purpose of changing the pitch radius of the pulleys and for the purpose of applying an axial force to the sides of the belt 16 which is substantially proportional to the net tangential force between the pulleys 12 and 14 and the belt 16. The force control mechanisms are designated generally at 22 and the ratio changing mechanism is designated at 24.

Figures 5, 6, 7:
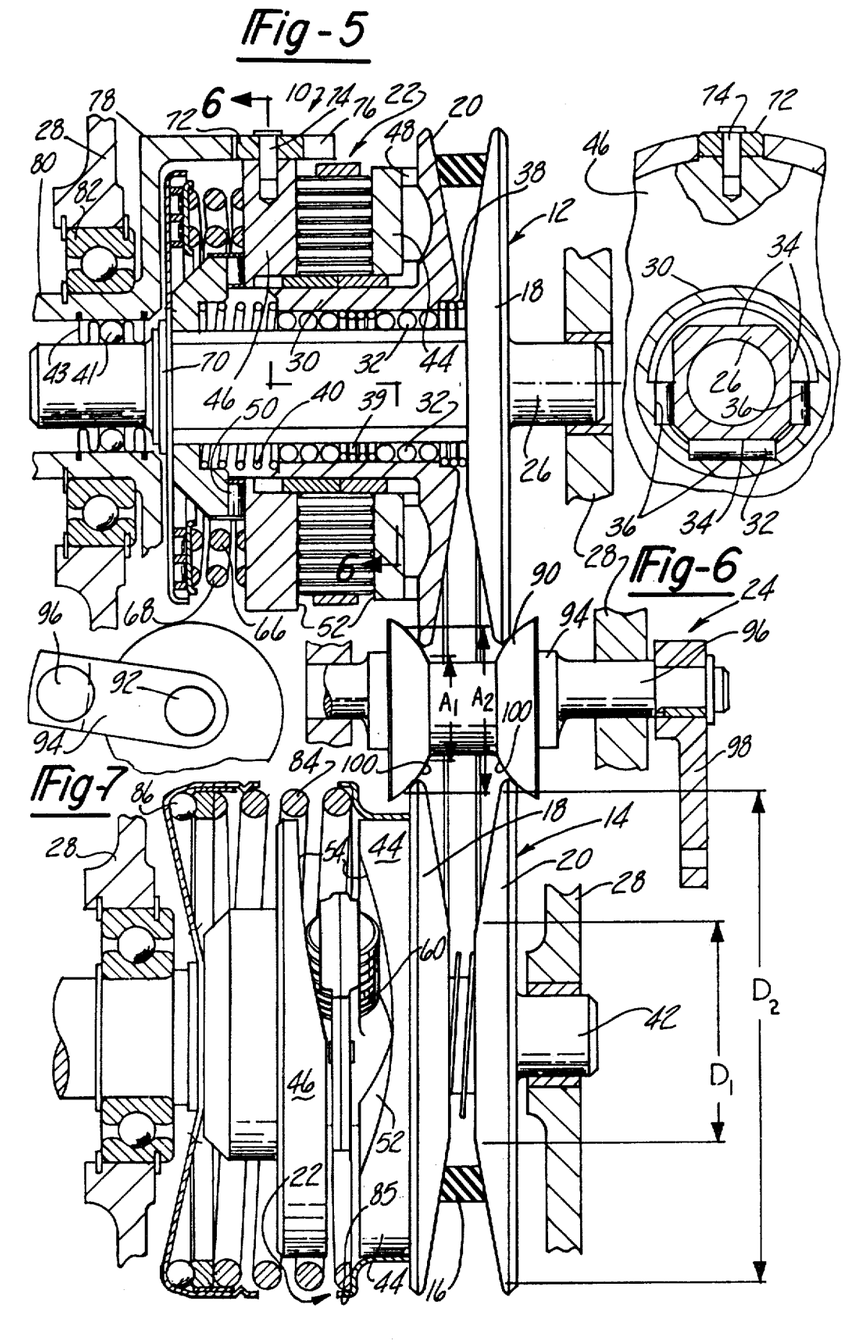
FIG. 5 is an enlarged cross-sectional view of the transmission embodying the invention.
FIG. 6 is a view taken on broken section line 6—6 in FIG. 5.
FIG. 7 is a side view of a portion of the mechanism seen in FIG. 5.

Referring now to FIG. 5 and particularly to the pulley 12, the flange 18 extends radially outwardly from an axle 26 opposite ends of which are supported in walls 28 of a transmission housing which is not shown in its entirety. The flange 20 is provided with a tubular hub or axle 30 which is mounted concentrically with the axle 26.

The flanges 18 and 20 are supported for rotational movement in unison and for axial movement relative to each other by rolling means, which can be spherical, but preferably are in the form of roller elements 32. As seen in FIG. 6, the axle 26 is formed with four longitudinally extending flat surfaces 34 which are opposed to spaced flat surfaces 36 on the inside diameter of the hub 30. The roller elements 32 are in engagement with the surfaces 34 and 36 to insure that the flanges 18 and 20 rotate simultaneously and at the same time minimize friction opposing the axial movement of the pulley flanges 18 and 20. The roller elements 32 are held in position by preloaded return springs 38, 39 and 40.

During simultaneous rotation of the flanges 18 and 20, any relative axial movement of the flanges will cause the roller elements 32 to change position and to roll about their axes which are transverse to the axis of the concentric axles 26 and 30. Although the roller elements 32 also move axial of the axles, their total paths of movement is minimized by means of the return springs 38, 39 and 40. As the pulley 12 rotates, the loading between axle 26 and collar 30 will be at a maximum at one side of the pulley 12 and will be at a minimum at a diametrically opposed point. The springs 38, 39 and 40 are such that they can be overcome by the maximum force between the axle 26 and hub 30 when the flanges 18 and 20 are shifted axially relative to each other but are of sufficient strength to return the roller elements 32 to their original position as the displaced roller elements 32 are transferred to the diametrically opposed point at which the loading between the axles 26 and 30 is at a minimum. This makes it possible to reduce the length of the hub 30 and the axial dimension of the system assembly because any displacement of the roller elements 32 from their normal position is continuously canceled during simultaneous rotation of the pulley and axial shifting of the flanges 18 and 20 relative to each other.

As viewed in FIG. 5, the left end of the axle 26 is supported by ball bearing elements 41 which are held in position by opposed springs 43. During rotation and axial shifting of the shaft 26, the bearings 41 are continuously returned to their original position by the springs 43 in much the same manner as the rollers 30.

The pulley 14 is generally similar to the pulley 12 in that the flanges 18 and 20 are of the same configuration. However, unlike the axial shiftable axle 26 for pulley 12, the axle 42 is axially stationary and is rotatably supported at its opposite ends in the wall 28 of the transmission housing. The flange 20 of the pulley 14 is fixed to and rotates with the axle 42 whereas the pulley flange 18 is axially movable relative to the axle 42 and is supported in driving relation with the axle 42 in much the same manner as the collar 30 and axle 26, that is, by self-centering rollers 32 in engagement with flat surfaces. The flange 18 of the pulley 12 and the flange 18 of the pulley 14 can be considered as the axially movable flanges and they are disposed diagonally relative to each other. Similarly, flange 20 can be considered as being substantially axially stationary and is diagonally disposed relative to the axially fixed flange 20 of the pulley 14.

The load control mechanism 22 by which the belt 16 is compressed between the flanges 18 and 20 with a force proportional to the belt tangential force includes a pair of plate members 44 and 46. As seen in FIG. 5 in connection with the pulley 12, the plate member 44 is fixed to the flange 20 by means of key 48 so that the plate 44 and flange 20 rotate as a unit. The plate 46 is supported on the hub 30 for rotation relative to the plate 44 but is restrained against longitudinal movement by the thrust roller bearing 50.

Facing surfaces 52 on the plates 44 and 46 form control surfaces which are developed in a specific manner to be more fully described later. In general, however, the curved surfaces have a configuration illustrated in FIGS. 8, 9 and 10. Each control surface 52 is generally annular with diametrically opposite portions 54 which are concave. The surfaces on the plates 44 and 46 are generated or formed by moving a cutting or grinding tool repeatedly in a straight line diametrically of the annular plates 44 and 46 while the latter are indexed in increments about their axes. For example, as viewed in FIG. 8, the edges designated at 56 are formed at the same time and are diametrically opposite each other and similarly the edges 58 are formed at the same time and are diametrically opposite to each other.

Figures 8, 9, 10, 11, 12:
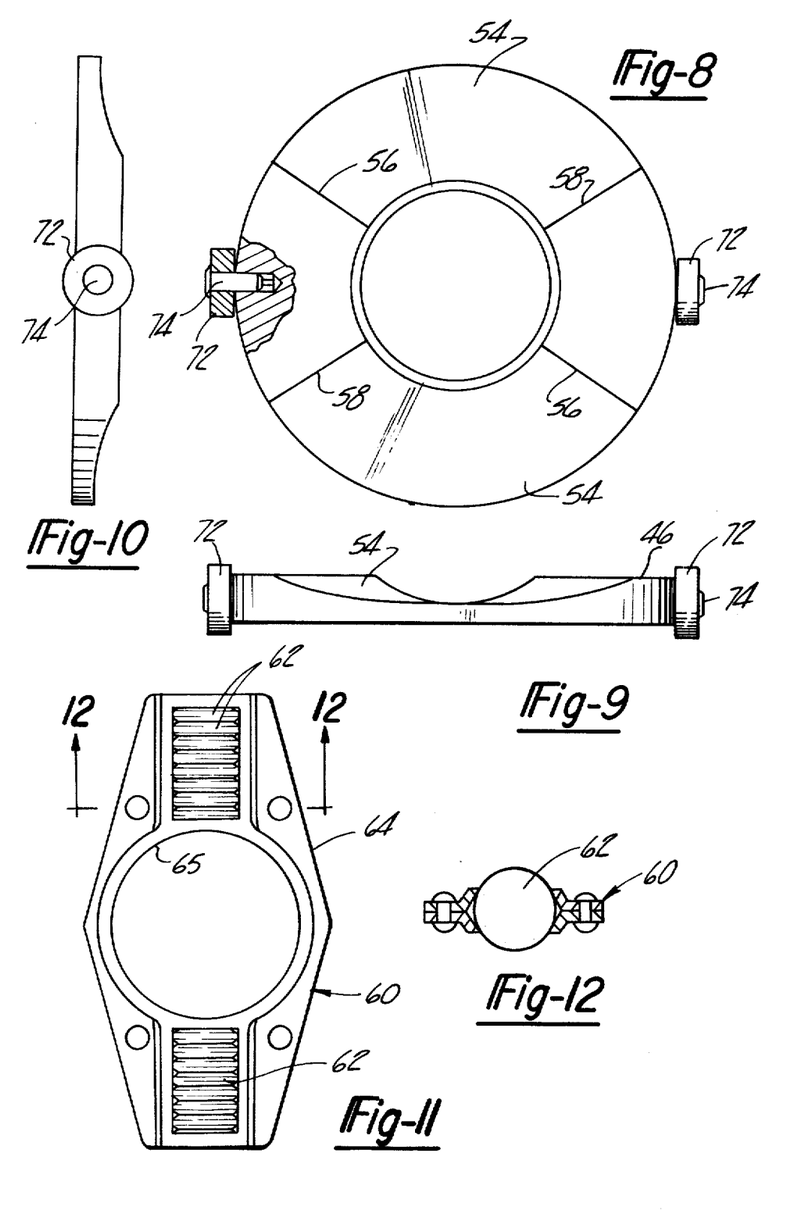
FIG. 8 is a plan view of one of the control elements in FIG. 5.
FIG. 9 is a side view of the control mechanism seen in FIG. 8.
FIG. 10 is another side view of the control element of FIG. 8.
FIG. 11 is a view of a roller assembly used in the assembly of FIG. 5.
FIG. 12 is a cross-sectional view taken on line 12—12 in FIG. 11.

In the assembled condition with the plates 44 and 46 facing each other, they are maintained in spaced relationship relative to each other by rolling means such as balls, tapered or barrel shaped rollers but preferably are cylindrical roller assemblies 60. Each of the roller assemblies 60 is also shown in FIGS. 11 and 12 and includes a stack of several roller elements 62, which are held together in a cage 64 for rotation independently of each other. The cage 64 is provided with an opening 65 by which it is rotatably mounted on the hub 30. The roller elements 62 are urged into continuous engagement with the control surfaces 54 on the plates 44 and 46 by coaxial springs 66 and 68 acting between the plate 48 and a thrust plate held in axial fixed position by a ring 70 on the axle 26.

During operation of the transmission 10, the plates 44 and 46 rotate relative to each other a limited amount and the roller elements 62 also rotate relative thereto about an axis which extends generally transversely to and intersects the axis of the axles 26 and 42. By using a plurality of roller elements 62, differential motion between the surface 54 and the roller assemblies 60 is reduced because of the freedom of axially outer rollers 62 to move a larger distance than axially inner rollers 62.

The outer circumference of the plate 46 is provided with rollers 72 mounted on radially extending axles 74. As seen in FIG. 5, the rollers 72 are received in grooves 76 forming part of a drive hub 78 concentric with axles 26 and hub 30. The rollers 72 and grooves accommodate relative axial movement of plate 46 and hub 78. The hub 78 has a hollow drive shaft 80 concentric with axle 26 and rotatably supported by a bearing 82 in the transmission wall 28.

The load control mechanism 22 associated with the pulley 14 is generally the same as that used with the pulley 12 and the like reference characters have been used to identify identical parts. In this instance, however, the movable flange 18 supports the plate 44 and movement of the plates 44 and 46 away from each other and consequently movement of the flanges 18 and 20 towards each other is under the urging of a spring 84 having one end seated on a collar 85 and the opposite end seated on bearings 86 to afford rotation of the plate 44 relative to the plate 46 which is longitudinally fixed relative to the axle 42.

When rotational driving force or torque is applied to the drive shaft 80 and the hub 78, it is transmitted through the rollers 72 to the control plate 46 which causes a rotational displacement between the plates 46 and 44 and at the same time causes the roller assembly 60 to generate axial spreading thrust between the facing control surfaces 52 and thereby squeezes the flanges 18 and 20 of the pulley 12 towards each other. The force that is applied to the belt 16 is proportional to the net tangential force of the belt thus generating sufficient friction between the flanges 18 and 20 of the pulley 12 to transfer the applied tangential force from pulley 12 to belt 16. As the belt 16 acts on the associated or driven pulley 14, the load control mechanism 22 associated therewith supplies a substantially equal squeezing action to the belt and the associated flanges 18 and 20 of pulley 14.

The drive ratio between pulleys 12 and 14 is determined by the radial distance of the path of belt 16 from the axis of the axles 26 and 42. A change in ratio is accomplished by varying the spacing between the flanges 18 and 20 of the pulleys 12 and 14. For example, pressing of the flanges 18 and 20 of one of the pulleys toward each other forces the belt 16 to move radially outwardly and increases the pitch radius. At the same time, the belt tension is momentarily increased which forces the flanges of the other pulley apart and causes a reduction in the pitch radius.

As viewed in FIGS. 5 and 7, the ratio changer 24 includes a rotatable control member in the form of a spool 90 freely rotatable on a pin 92 supported by a yoke 94 rigidly mounted to a shaft 96. The shaft 96 is rotatably supported in transmission walls 28 and can be rotated through means of the lever 98.

Change in ratio of the transmission 10 can be accomplished by swinging the spool 90 about the shaft 96 into engagement with either of the pulleys 12 or 14 seen in FIG. 5. The spool 90 is provided with opposed curved surfaces 100 and as force is applied to the spool, the associated flanges 18 and 20 are squeezed or urged toward each other. This causes the pitch radius of the control pulley to increase and the pitch radius of the uncontrolled pulley to decrease. The spool 90 is provided with curved control surfaces 100 to preserve spool proximity to the flanges of both pulleys at all ratios.

The shaft 96 of the ratio changer 24 can be controlled manually or it can be programmed by mechanical or electrical systems to rotate the shaft 96 to bring about the desired ratio changes. As seen in FIG. 5, the dimension $D_1$ designates the minimum diameter of the belt path and $D_2$ the maximum diameter. These diameters are in the same ratio as the dimensions $A_1$ and $A_2$ at the spool 90 so that there is no changes in spool speed when it moves out of engagement with one pulley 12 or 14 into engagement with the other pulley.

It should be understood that the spool 90 can be moved into engagement with the flanges 18 and 20 of either pulley 12 or pulley 14 to change ratio. Also during ratio changes the belt is shifted axially in the same direction relative to both of the axles 26 and 42. For example, if the pitch radius of the pulley 12 is increased from the ratio illustrated in FIG. 5, the belt 16 will move to the left a slight amount. At the same time, the pitch radius of the pulley 14 will be decreased and radial inward movement of the belt 16 will cause it to be shifted to the left a like amount. As a consequence, the belt remains aligned in a plane which remains normal to the axes of rotation of the pulleys 12 and 14 for all changes in ratio.

Figures 13, 14:
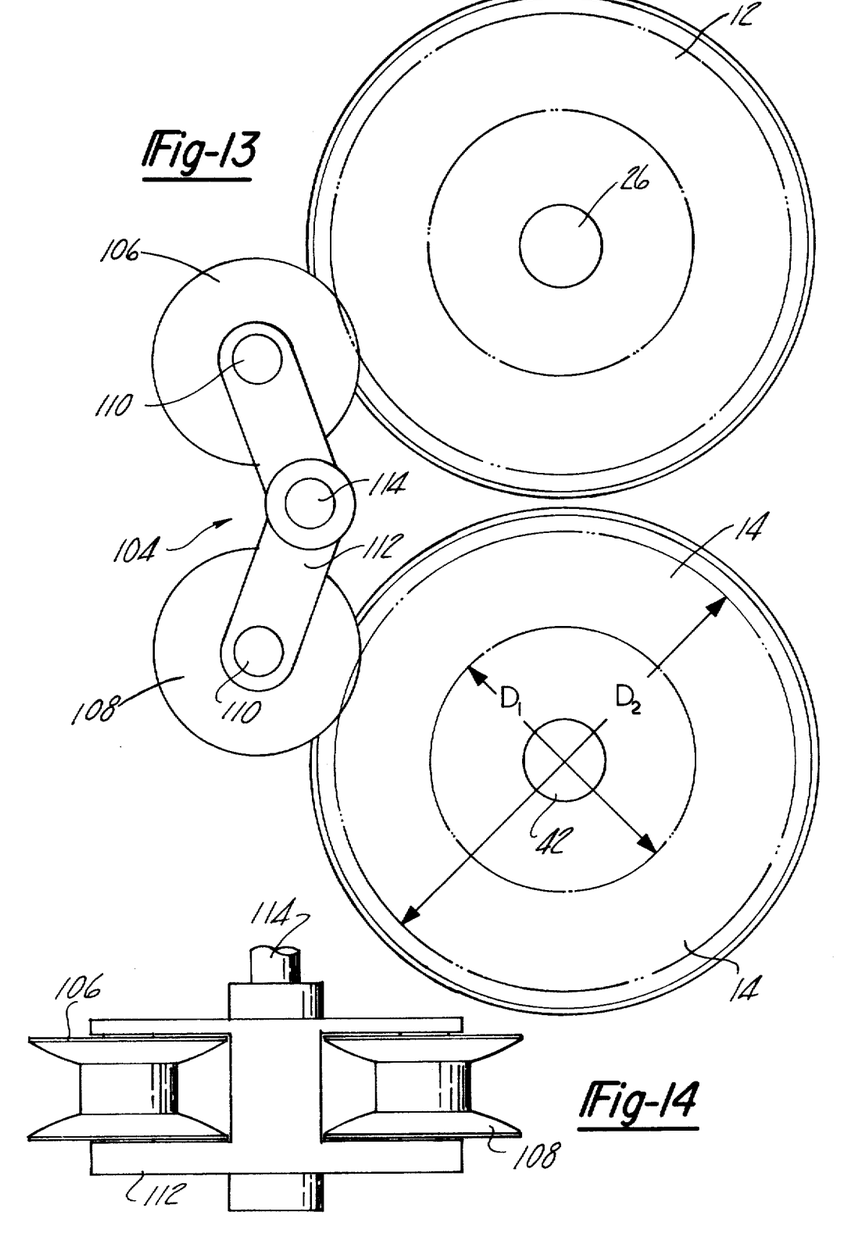
FIG. 13 is an enlarged view of another embodiment of the invention.
FIG. 14 is an end view of the arrangement seen in FIG. 13.

A modified form of ratio changing device 104 illustrated in FIGS. 13 and 14 includes a pair of spools 106 and 108 which are associated with the pulleys 12 and 14, respectively. The spools 106 and 108 are supported for free rotation about axles 110 mounted in a double yoke 112. The yoke 112 is fixed to a shaft 114 which can be rotated to move a selected one of the spools 106 or 108 into engagement with either the pulley 12 or the pulley 14 to bring about ratio change in the same manner as with the ratio changer 24 seen in FIG. 5. This occurs because the spools 106 and 108 are generally identical to the spool 90 in that they have curved surfaces to engage the pulleys 12 and 14. The ratio changer 104 is particularly suitable for use where it is necessary for the axles 26 and 42 to be in a particular arrangement, for example, closer to each other than that illustrated in FIG. 5.

Figure 15:
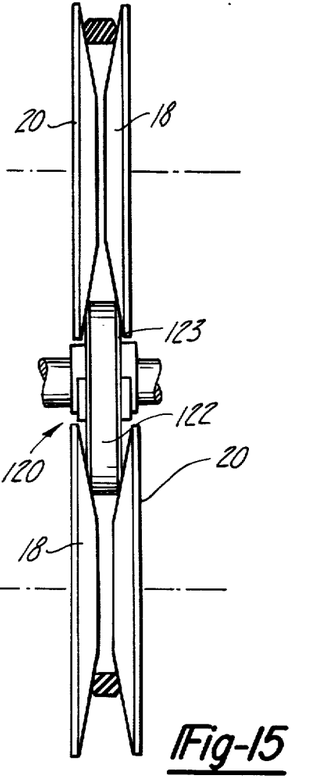
FIG. 15 is an end view of another embodiment of the invention.
Figure 16:
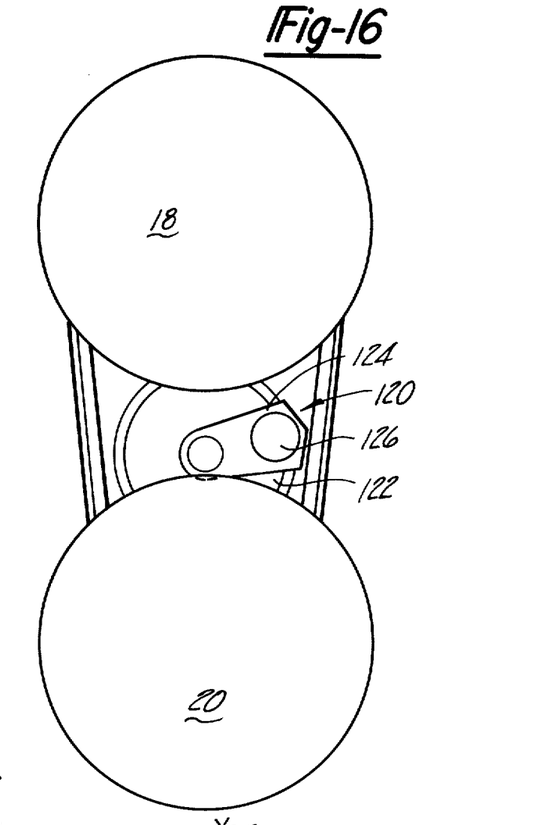
FIG. 16 is a plan view of the arrangement seen in FIG. 15.

Still another form of ratio changer 120 is illustrated in FIGS. 15 and 16 in which the flanges 18 and 20 of pulleys 12 and 14 can be spread apart by a control member or wheel 122 having complementary beveled surfaces or edges 123 corresponding to surfaces of the flanges 18 and 20. The wheel 122 is supported on a yoke 124 which swings about an axis formed by the pin 126 for engagement with a selected one of the pulleys 12 or 14. Spreading the flanges 18 and 20 of one of the pulleys will cause the pitch radius of that pulley to be reduced and simultaneously the pitch radius of the associated pulley will be increased. During the full range of ratio changing movement the surfaces 123 are in engagement with one pulley and in very close proximity with the other pulley.

When transmissions of the type disclosed are used in certain applications, for example, in automobile transmissions, the arrangements are frequently subject to reversal of torque. For example, during coasting, output axle becomes the driving member and drives the axle coupled to the engine. This causes backlash when input torque is suddenly restored to the maximum driving force. Such sudden torque reversals are common with transmissions used in automobiles and with belt type variable speed transmissions the shock loads on reversal of torque could become so great as to damage the system. With the present invention, problems of backlash and loading are minimized. However, it is contemplated to also eliminate the problem of load reversal in certain types of transmission by providing a free-wheeling device 180 shown diagrammatically in FIG. 2. The free-wheeling device can be in the form of a one-way clutch making it possible for torque to be transmitted from the input shaft to the output shaft but not in the opposite direction as would occur during coasting of a vehicle. Preferably, the free-wheeling device should be associated with the input axle but even when associated with the output, the arrangement serves to protect against torque reversal and shock loads. The same effect can be achieved by using other forms of yielding means between the power source and the input to the pulley.

Referring now to FIGS. 1 through 4 and 17, the shape of the control surfaces 54 will be described. The shape determines the force applied axially against the sides of the belt to maintain the proportional relationship of the useful tangential force at the belt and its friction coefficient with the pulley to produce the pressure needed to transmit power from one pulley to another.

Energy is transferred from the belt 16 to a pulley 12 or 14 by tangential forces exercised by the belt to the pulley flanges 18 and 20 through friction between belt sides 150 and flanges 18 and 20 in FIG. 15.

Figures 3, 4:
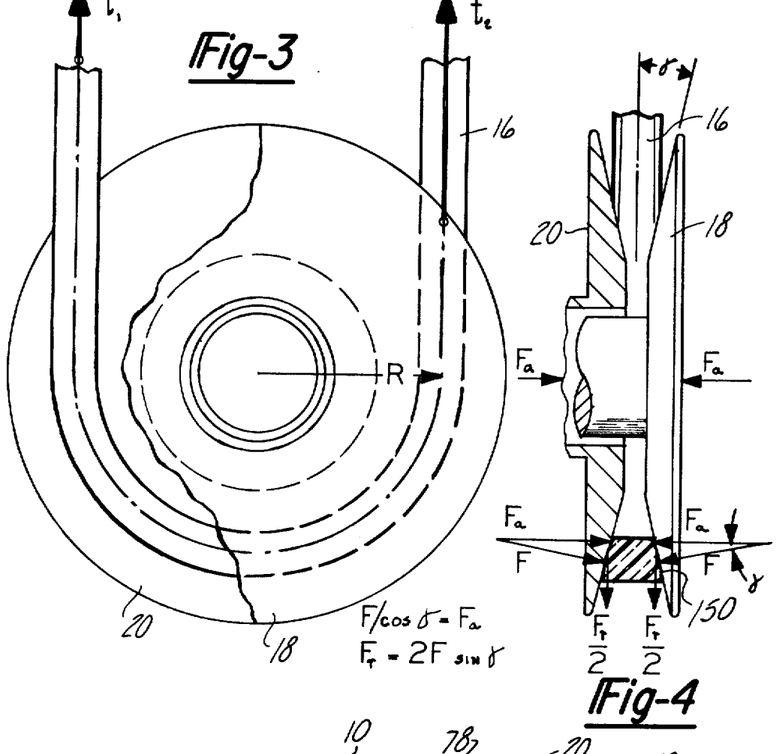
FIG. 3 is an enlarged view of one of the pulleys seen in FIG. 1.
FIG. 4 is a cross-sectional view of the pulley seen in FIG. 3.

FIG. 3 shows a belt within a flanged pulley in which: $t_1$ and $t_2$ are the tensions of the driven and driving force.

R is the pitch radius of the pulley.

Torque $=(t_2-t_1)$ R, the torque applied to the pulley.

FIG. 4 shows the cross section of belt 16 and a pulley in which:

F is the total force between flanges and belt. With $f_t$ the friction coefficient component tangential to the pulley pitch line, then:

$$2f_t FR = (t_2 - t_1)R \qquad \text{I.}$$

$F_t$ is the tangential force available from the friction between the belt 16 and flanges 18 and 20 and:

$$F_t = 2f_t F \geq t_2 - t_1 \qquad \text{II.}$$

FIG. 4 shows $F_a = F/\cos \gamma$ is the axial thrust within flanges wherein:

$\gamma =$ is the angle between the pulley flange and the bisecting plane between flanges.

FIG. 2 shows $F_r = 2$ F sin $\gamma$ which is the sum of the radial force caused by squeeze F upon the belt in the radially outward direction.

$2f_r F \cos \gamma$ is the radially restraining friction between belt and flanges along flange cone; $f_r$ is component of the friction coefficient in the radial direction.

$F_{fr} = 2f_r F \cos \gamma$ is the friction radial component opposing the belt exit from the groove.

The useful tangential force (U.T.F.) produced by a belt is the difference between the tensions $t_1$ and $t_2$ of the two free sides of the belt.

$$U.T.F. = t_2 - t_1 \leq F_t \qquad \text{III.}$$

This force is transferred to or from the belt to the pulley according to equation II.

$$F_t = 2f_t F \qquad \text{IV.}$$

F being the compression of the pulley flanges on the belt, $f_t$ being the friction coefficient between belt and pulley.

As shown in FIG. 1, F is generated by axial force $F_a$ parallel to pulley axes as for the following equation:

$$F = F_a \cos \gamma \qquad \text{V.}$$

Figure 17:
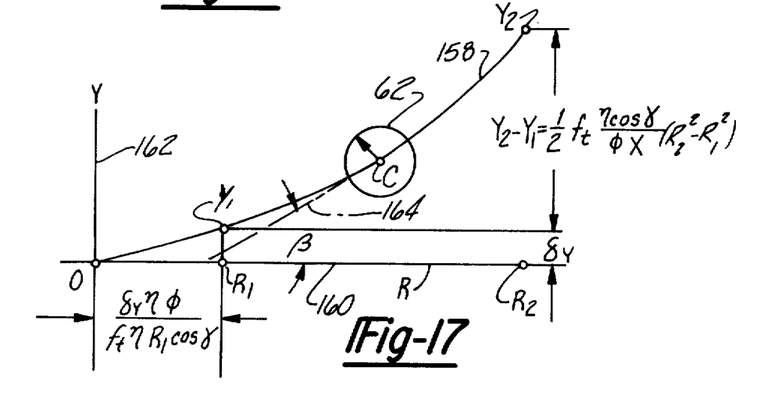
FIG. 17 depicts a curve by which the control surfaces of the transmissions mechanism are developed.

Referring now to FIG. 17, a curve is shown in which a point C designates the axis of a roller element 62 as it climbs one of the curved control surfaces 54 as the roller assembly 60 is forced by the movement of the opposed control surface 54. In FIG. 17, the line 160 designates the intersection of a cylinder of radius X coaxial with the pulley axes and a plane transverse to the axis of axle 26 or 42 and line 162 designates the axis of the axles 26 or 42. At any given location of the point C, a line 164 tangent to the curve 158 will intersect the line 160 and the included angle can be designated as $\beta$. As a result:

$$F_a = \frac{1}{2} \eta \frac{T}{X \tan\beta} \qquad \text{VI.}$$

in which T/2 is the torque at each pulley flange, X is the distance from C from the axis of the pulley and $\eta$ designates the efficiency.

If $\phi$ is the desired safety factor greater than 1 used to insure that the belt will not slip on the pulley then:

$$f_t(F_a \cos \gamma) = \frac{1}{2}\phi(T/R) \qquad \text{VII.}$$

$$F_a = \frac{1}{2} \frac{\phi T}{f_t R \cos \gamma} \qquad \text{VIII.}$$

from VI $$\frac{\eta}{X \, tg\beta} = \frac{\phi}{f_t R \cos \gamma}$$

$$tg\beta = \frac{f_t \eta \cos \gamma}{\phi X} R$$

Indicating with y the ordinate of point C in FIG. 17

$$tg\beta = \frac{dy}{dR} = f_t \frac{\eta \cos \gamma}{\phi X} R \qquad \text{IX.}$$

If $R_2$ is the maximum pulley radii and $R_1$ the minimum, $y_2-y_1$ is ½ of the total axial travel of the pulley flanges $$y_2 - y_1 = \tfrac{1}{2} f_t \frac{\eta \cos \gamma}{\phi X} (R_2^2 - R_1^2) \qquad \text{X.}$$

from which X is determined and the equation defined. Thus we have a curve or shape for the surfaces 54 capable of generating the correct amount of compression to the side of the belt 16 proportional to the belt tangential force.

The above equations are particularly applicable to relatively uncompressible belts such as those made of metal. However, when the belts are made of yielding material in which the belts will deflect a given amount δy at maximum axial compression, the total ordinate of the path of the point C of the rollers 62 becomes:

$$Y_2 - Y_1 + \delta y = \delta y + \tfrac{1}{2} f_t \frac{\eta \cos \gamma}{\phi X} (R_2^2 - R_1^2) \qquad \text{XI.}$$

and the total corresponding abscissa becomes:

$$\frac{\delta y X \phi}{f_t \eta \cos \gamma R_1} + (R_2 - R_1)$$

With the present invention in which the force on the sides of the belt is maintained in proportion to the belt tangential force and the belt friction for all selected ratios of the pulleys 12 and 14, the life and efficiency of a transmission system is increased substantially over the prior art arrangements in which compression on the belt is generated in proportion to the torque. In a transmission of the prior art with a five-to-one ratio in which the axial loading on the belt is adequate for the smallest radius of belt operation, an overload would be produced at the maximum radius 2.24 times greater which is arrived at by using the square root of the maximum ratio, that is 5. Since the life of these categories of devices is substantially inversely proportional to the third power of the load, it would decrease the durability to approximately 1/11 of the durability of the present system. The denominator is arrived by raising the square root of 5 to the third power, that is 2.24 times to the third power.

The pulley and variable ratio belt drive previously described is expected to be suitable up to a six-to-one ratio range. Another embodiment of the invention is illustrated in FIGS. 18 and 19 in which the range may be extended up to a ratio of twelve-to-one or more and at the same time the backlash problem at torque reversal, such as occurs in a vehicle using such transmissions when changing from driving torque to coasting torque or braking torque is substantially reduced.

Figure 18:
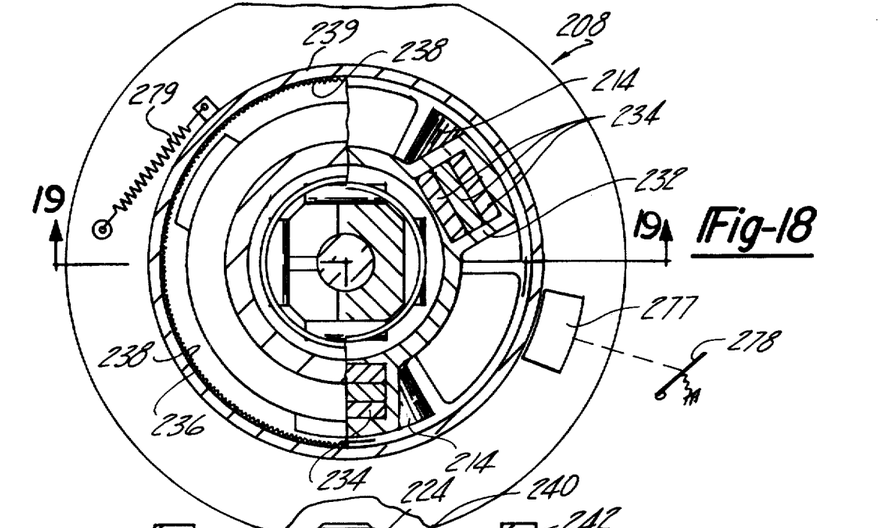
FIG. 18 is a cross-sectional view of another embodiment of the invention taken on irregular section line 18—18—18 in FIG. 19.
Figure 19:
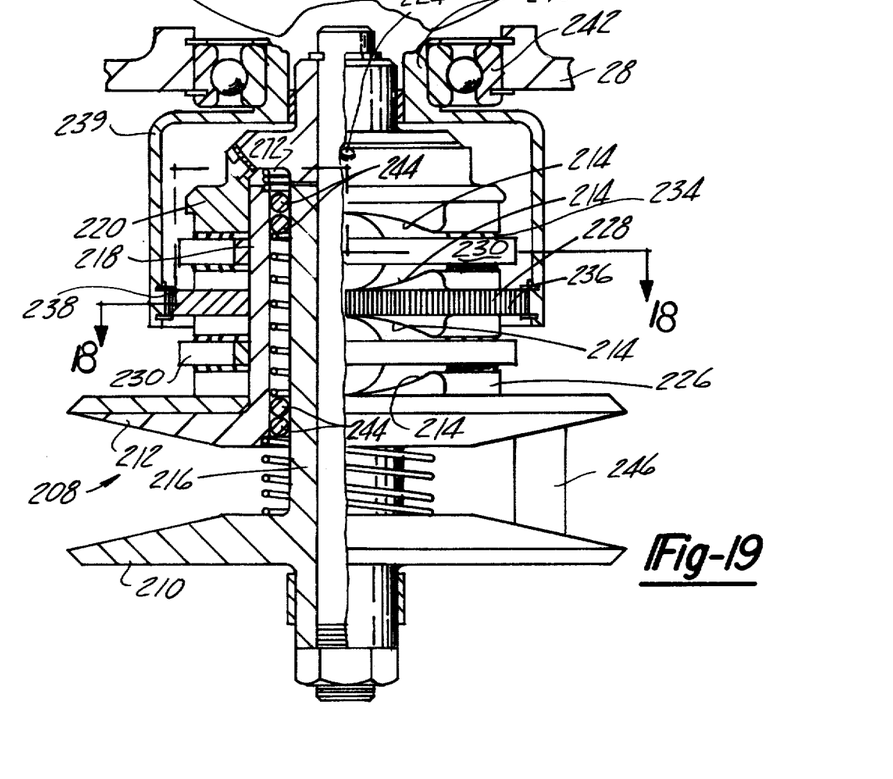
FIG. 19 is a cross-sectional view taken on irregular section line 19—19—19 in FIG. 18.

The principal differences between the embodiment of the invention illustrated in FIGS. 18 and 19 over the prior embodiment is that a pulley 208 has flanges 210 and 212 which are both movable axially relative to a plane extending transversely to the axis of rotation. Also, instead of a single set of opposed concave control surfaces 54, there are a pair or more of such sets of control surfaces 214. Also in the prior embodiment, pairs of control surfaces 54 were arranged diametrically relative to each other. In the embodiment of the invention in FIGS. 18 and 19, the control surfaces 214 can extend radially in uniformly spaced relationship to each other and particularly as seen in FIG. 18, can be an odd number, for example three of such control surfaces.

Referring now to FIGS. 18 and 19, the flange 210 is fixed to an axle 216 concentric with a hub 218 integral with the flange 212. The axle 216 is tortionally engaged to a flange or plate member 220 connected to a member 222 by means of pins 224. Members 220 and 222 have complementary spherical surfaces to uniformly distribute the loads. Pulley flanges 212 is fixed to a plate 226. Both the plate member 226 and the plate member 220 indirectly connected to the flange 210 have identical control surfaces 214.

Interposed between the control surfaces on plate 226 and on flange 220 is an annular disc 228 opposite sides of which are provided with control surfaces 214 of the same type and in the same arrangement as the control surfaces 214 on the flange 226 and the flange 220. All of the control surfaces are generated as described in connection with the curve in FIG. 17 and the earlier embodiment of the invention.

Disposed at opposite sides of the annular disc 228 are a plurality of roller assemblies 230. Each roller assembly 230 includes a cage 232 and segmented roller elements 234 which roll about radially extending axes correspond in number to the number of control surfaces 214. The cages 232 are disposed so that the rollers 234 are in simultaneous engagement with opposed control surfaces 214 on the annular disc 228 and on the plates 220 and 226.

The annular disc 228 has external serrations 236 in engagement with internal serrations 238 on a cup-shaped drive member 239 connected to a hollow shaft 240 journaled in a bearing 242 in the wall 28 of a transmission housing. The hollow shaft 240 can form either the input or the output for the pulley 208.

Upon application of power to the hollow shaft 240, the flanges 210 and 212 of the pulley 208 rotate in unison by way of roller bearings 244 similar to the bearings 32 in FIG. 5. In other words, the roller bearings 244 engage opposed flat surfaces on the axle 216 and on the hub 218 to insure that the flanges 210 and 212 rotate in unison but at the same time can move axial relative to each other.

When torque is applied to the hollow shaft 240, it is transferred by way of drive member 239, complementary serrations 236 and 238 to the annular disc 228 tending to rotate the disc 228 relative to the adjoining flange 220 and plate 226 thereby wedging the roller elements 234 against the corresponding control surfaces 214.

The control surfaces 214 are formed in the same manner, as in the prior embodiment of the invention, so that the wedging action of the roller elements 234 causes an axial force to compress a drive belt 246 between the pulley flanges 210 and 212 in proportion to the net tangential force of the belt and the friction between the belt and the pulley flanges 210, 212.

Figures 20, 21:
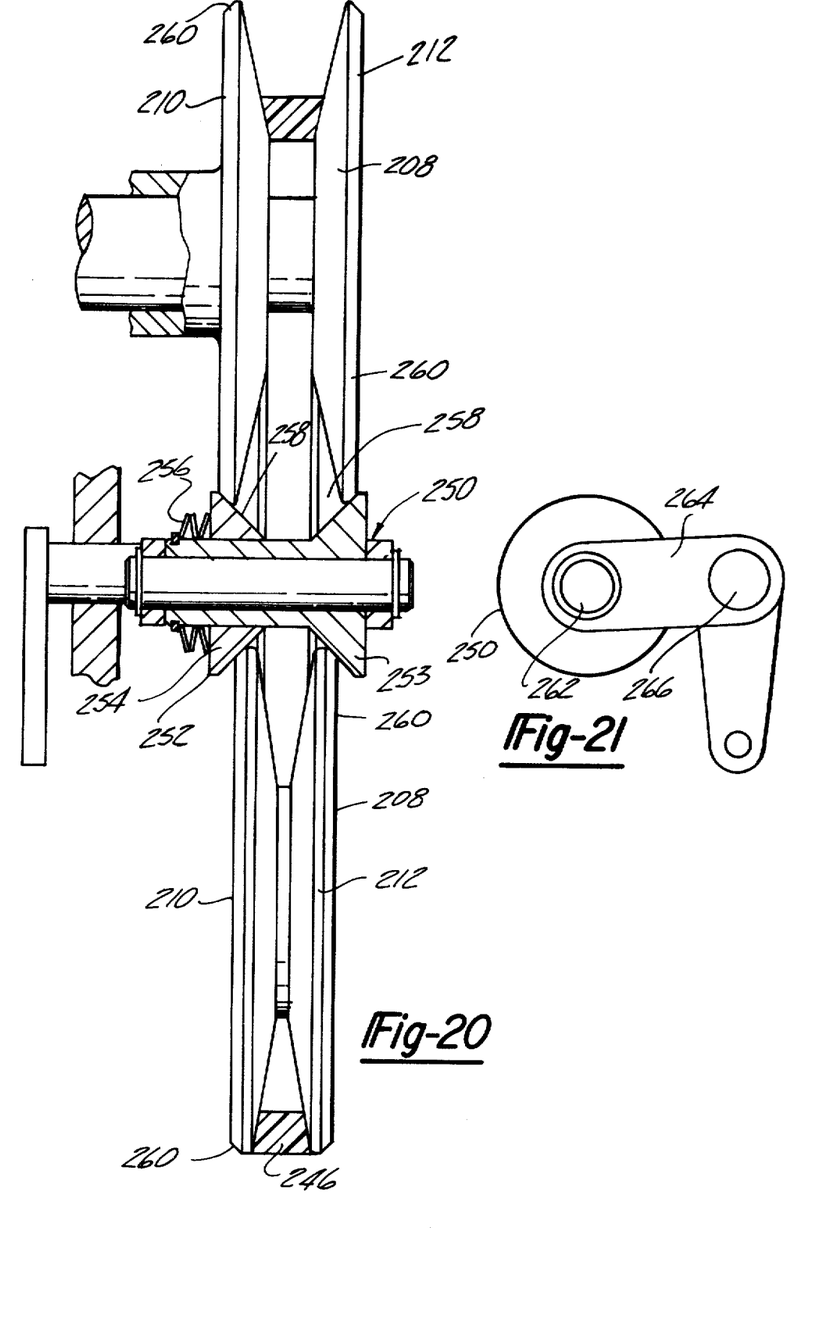
FIG. 20 is a view partly in cross section of another form of ratio adjusting device to be used with the embodiment of FIGS. 18 and 19.
FIG. 21 is an end elevation of the adjusting device in FIG. 20.

Referring now to FIGS. 20 and 21, the use of a pair of pulleys 208 interconnected by a belt 246 is illustrated together with a ratio changer 250. The ratio changer 250 includes a spool 252 with flanges 253 and 254 which are movable toward each other under the biasing action of a spring 256. The flanges 253 and 254 have opposed conical surfaces 258 in engagement with complementary beveled surfaces 260 on the flanges 210 and 212. The ratio changer spool 250 is rotatably mounted on a pin 262 supported by a yoke 264 keyed to a shaft 266. When the pulleys 208 are being rotated the ratio therebetween can be changed by rotating the shaft 266. This causes the surfaces 258 to press the surfaces 260 of the pulley 208 being engaged. This causes the flanges 210 and 212 of one pulley 208 to move axially toward each other while permitting the flanges of the other pulley 208 to move apart thereby resulting in a ratio change.

Zero torque occurs when a transmission incorporating the pulleys 208 is in a transient condition between driving and coasting. At such a time pressure between the pulley flanges 210 and 212 and a belt 246 would be disturbed and would interfer with the restoration of traction. This condition is avoided by making the spool 250 so that the flanges 253 and 254 are biased towards each other under the action of the spring 256. This serves to maintain force on opposite sides of the belt.

It will be evident that the greater the outer diameter of the flanges 210 and 212 in proportion to the inner diameter of the belt engaging surfaces of the flanges, the greater the range of ratio change that can be performed. Also a greater axial movement of the flanges 210 and 212 must be achieved to cause the belt 246 to operate from the radial inner position to the radial outer position. The axial movement of the pulley flanges 210 and 212 is equal to the closing or spreading of annular disc 228 and the flange 220 and plate 226 under the action of the roller elements 234. To accomplish this, the depth and circumferential length of the control surfaces 214 must have to increase in the same proportion to the axial movement. In this embodiment of the invention, this has been accomplished by arranging two systems of roller assemblies 230 in layers. With the arrangement of a single layer of rollers, as described in the embodiment illustrated in FIG. 5, the maximum ratio change would be approximately six-to-one whereas with the double layer of roller assemblies 230 the overall ratio can be extended to twelve-to-one.

In addition to extending the possibility for greater ratio changes, the operating plane of the belt 246 remains stationary instead of shifting axially in response to pulley flange movement.

The power associated with the hollow shaft 240, whether it is acting as an input or an output member, is distributed in equal amounts to the flange 220 and plate 226. Such loads are distributed uniformly through the space roller assemblies 230, thus insuring high bending rigidity and operating efficiency.

The backlash problem can be further reduced, for example, in automobile transmissions employing pulleys 208 by incorporating a friction applying device or brake mechanism indicated diagrammatically at 277 which engages the exterior surface of the cup-shaped drive hub 239 in response to release of an automobile accelerator pedal 278 and momentary release of the clutch between engine and transmission. In this manner when the pedal is released, the brake 277 retards the motion of the drive hub 239, thus immediately transferring the system to coasting. In a similar manner a spring 279, shown diagrammatically in FIG. 18, returns the system to driving position when the accelerator pedal 278 is depressed causing a momentary clutch disengagement from the engine.

Figures 22, 23, 30, 31:
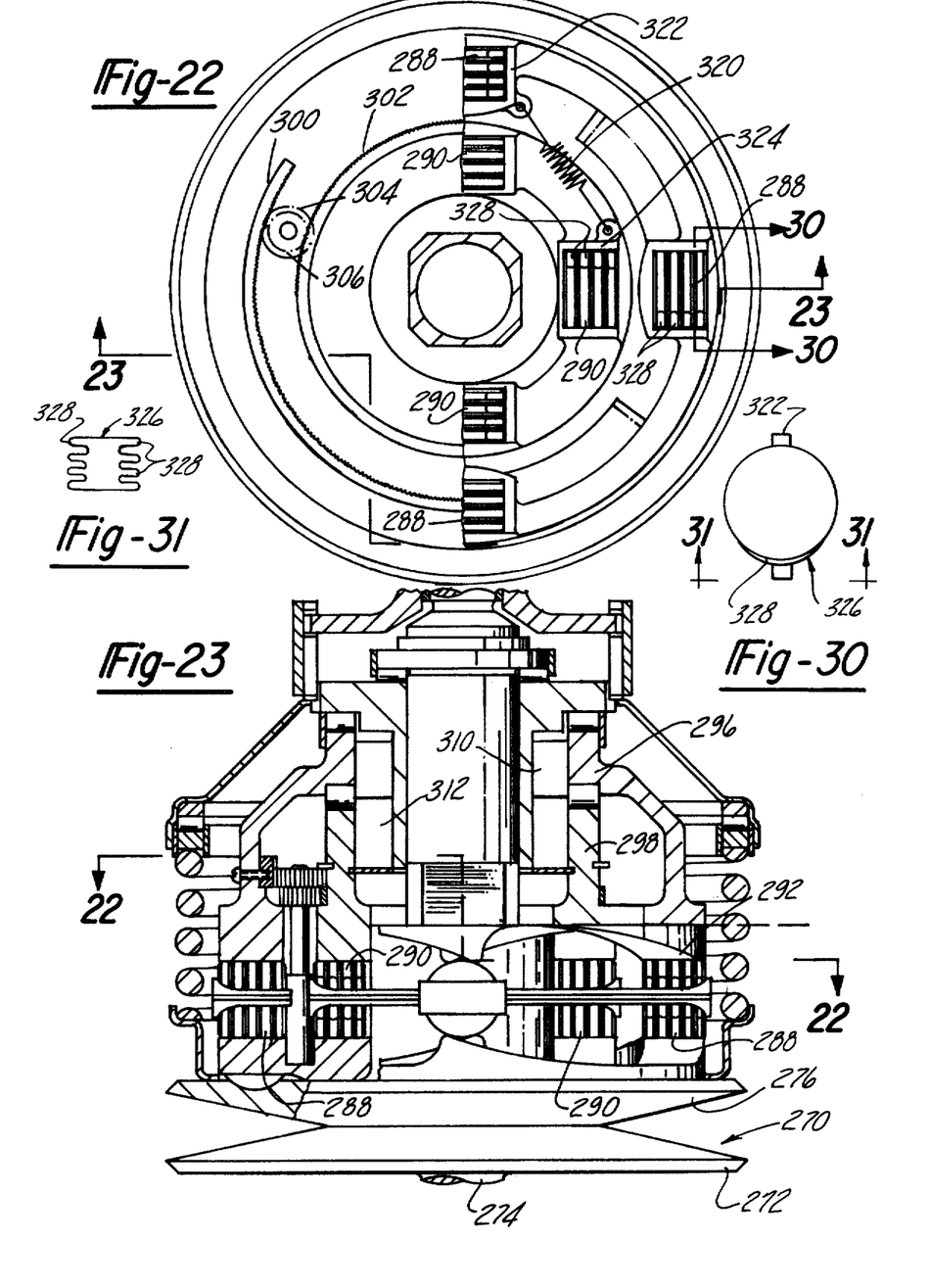
FIG. 22 is a view of another embodiment of the invention taken on irregular section line 22—22 in FIG. 21.
FIG. 23 is a cross-sectional view taken on irregular section line 23—23—23.

Still another embodiment of the invention is illustrated in FIGS. 22 through 29. In disclosing the embodiments in FIG. 5 and in FIGS. 19 and 20, reference was made to the problem of avoiding shock loads resulting from backlash and torque reversal. The purpose of the mechanism disclosed in FIGS. 22 and 23 is to eliminate backlash.

Referring to FIGS. 22 and 23, a variable ratio pulley 270 has one flange 272 integral with a shaft 274. A second flange 276 is mounted on a shaft 274 for axial movement relative to the flange 272 but for rotation therewith. When pulley rotation occurs in one direction, the flanges 272 and 276 are urged axially towards each other by the action of roller elements 288 and when torque and rotation reverses, by rollers 290.

Figure 24:
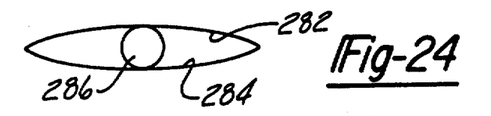
FIGS. 24 and 25 are diagrammatic views illustrating the action of control elements and control surface of belt type variable ratio transmissions.

The construction of the variable ratio pulley 270 for use in a transmission system can best be understood by first referring to FIG. 24 in which opposed control surfaces 282 and 284 associated with a pair of flanges of a pulley are forced apart by a roller element 286 upon the application of torque and resulting in the loading proportional to the tangential force in the belt connecting such pulleys. The control surfaces 282 and 284 are identical to each other and are generated in accordance with the formula referred to in connection with FIG. 17.

Figure 25:
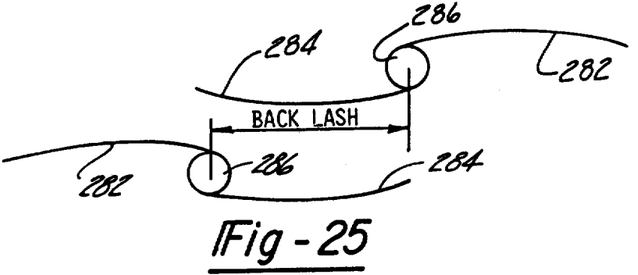

FIG. 24 indicates the roller 286 in its midposition and as positive torque is transmitted, roller element 286 assumes a position relative to the control surfaces 282 and 284 as illustrated diagrammatically in FIG. 25. When the torque suddenly reverses the roller element 286 moves to the opposite end of each of the control surfaces 282 and 284 traveling the distance indicated as backlash in FIG. 25. A high intensity torque reversal can seriously damage a transmission device of this general type.

Figure 26:
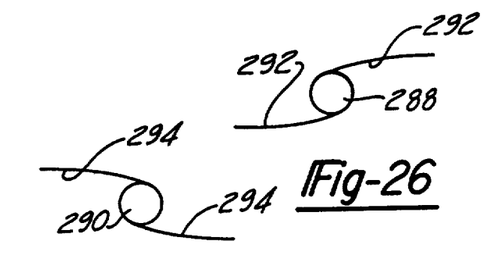
FIGS. 26 through 29 diagrammatically illustrate the relationship and action of various elements of the transmission of FIGS. 22 and 23.

In this embodiment of the invention and as illustrated in FIG. 26, torque reversal is accommodated by two sets of roller systems 288 and 290 for the single roller system 286. The roller 288 in FIG. 26 can be considered as being for the purpose of transmitting positive torque and the roller 290 for transmitting negative torque. This is accomplished by having two sets of control surfaces 292 and 294 associated with the rollers 288 and 290, respectively, and disposed concentrically relative to each other. The control surfaces 292 and 294 are generated pursuant to the characteristic curve described in connection with FIG. 17. Also since the surfaces 292 act to transmit only positive torque and the surfaces 294 only negative torque, they can be one half the dimension of control surfaces such as 282 and 284 acted on by rollers 286 in both directions of torque transmittal.

Figure 27:
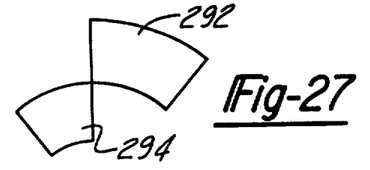
Figure 28:
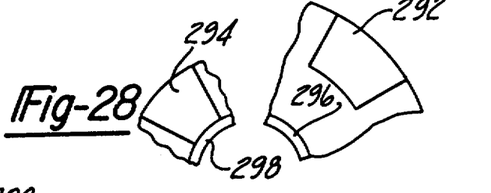
Figure 29:
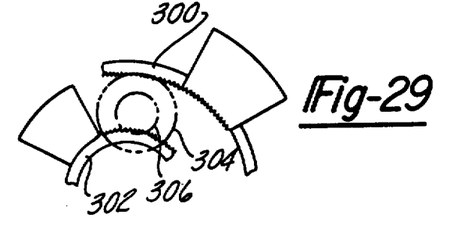

As shown in FIG. 27, the radially outer control surface 292 considered as associated with positive torque and the radially inner control surface 294 is associated with negative torque. Referring now to FIG. 28, the control surface 292 is associated with a sleeve 296 and the control surface 294 is associated with a sleeve 298. In addition, the control surfaces 292 and 294 are supported to move with toothed rings 300 and 302, respectively, as indicated in FIG. 29. A pair of toothed gears 304 and 306 are connected together to rotate as a unit and are in mesh with the toothed rings 300 and 302, respectively. The ratio between the gears 304 and 306 is such that for a given angular motion of an outer control surface 292 around the pulley axis, an equal angular and opposite motion is transferred to the control surface 294 thus causing a mirror duplication of position between driving and driven rollers.

Referring now to FIGS. 22 and 23 in which reference characters the same as those in FIGS. 26 through 29 are used, the control surface 292 is integral with sleeve 296 and receives positive torque through a one-way clutch indicated at 310. Another one-way clutch 312 is disposed between sleeve 298 and the input drive sleeve 114. While one-way clutch 312 is engaged in transmitting torque the other one-way clutch 312 is disengaged and is free wheeling.

It will be noted from an examination of FIG. 22 that there are four sets of rollers 288 and four sets of rollers 290 arranged to rotate about radially extending axes and uniformly spaced circumferentially.

To insure that all the rollers 288 and 290 simultaneously engage the control surfaces 292 and 294, a tension spring 320 is secured to a cage 322 holding the outer rollers 288 and at the other end to a cage 324 associated with the inner rollers 290 as seen in FIG. 22. The spring 320 biases the cages 322 and 324 towards each other and in the direction of the relative torque transmittal. Also, simultaneous engagement of each segment of the segmented rollers 288 and 290 is insured by the use of a laminar spring 326 seen in FIGS. 30 and 31. The spring 326 has oppositely extending pairs of fingers 328 which act against each roller segment and acts between the roller cage 288 or 290 and each roller segment to wedge the rollers between the control surfaces 292 and 294. This serves to compensate for the diametrical variation between roller segments.

Referring again to FIG. 26, backlash upon torque reversal is avoided because with the roller elements 288 acting on and forcing the surfaces 292 apart when torque is applied in one direction will locate the roller elements 290 relative to the surfaces 294 so that they are appropriately positioned when the torque reversal occurs.

The ratio between belt driven pulleys 270 employed in a transmission made up of two such pulleys can be changed by any one of the ratio changing devices disclosed in connection with the other described embodiments of the invention.

The belt 16 referred to in connection with the various embodiments of the invention can be made of a variety of materials such as rubber or metal or combinations thereof. When the belts employed are substantially rigid transversly, the conical surfaces of the pulley flanges in the various embodiments of the invention can be surfaced with a rubber-like material in which case the various control surfaces such as 54 in FIG. 5, 214 in FIG. 19, or 292 or 294 in FIGS. 27 through 29 can be generated in accordance with the equations for belts made of rubber-like material as provided for following equation XI.

A variable ratio belt drive has been provided in which a pair of pulleys interconnected by a belt each have relatively movable flanges and in which the ratio of the pulleys can be changed so that a reduction in radius of one pulley results in an increase of radius of the other pulley. For all ratio changes, the load between the pulleys and the belt is proportional to the useful tangential force at the belt and its frictional coefficient with the pulley to produce only the required pressure between opposed sides of the belt and the pulley flanges to transmit the applied power from one pulley to the other. The force on the sides of the belt results from control plates having opposed control surfaces of a particular configuration acted on by rolling means so that the plates are forced apart in response to the application of torque to move the pulley flanges axially toward each other with the required force which is proportional to the useful tangential force. Changes in ratio are made by mechanical means acting directly on the flanges of a pulley. One embodiment of the invention provides for using multiple sets of control surfaces to enlarge the range of movement of pulley flanges thereby making it possible also to increase the maximum attainable ratio. Still another embodiment of the invention is directed to using separate control surfaces depending on the direction of rotation of a variable ratio pulley to eliminate backlash that can occur.

The embodiments of the invention in which an exclusive property or privilege is claimed are defined as follows:

1. A variable ratio pulley for a belt drive comprising: a pair of disk-shaped flanges supported coaxially of each other for rotation as a unit and for movement axially relative to each other, said flanges having conical surfaces converging relative to each other radially inwardly and adapted to receive a transmission belt therebetween extending around and tangentially toward and away from said flanges, ratio control means for moving said flanges axially to selected positions relative to each other to change the pitch radius at which said belt engages said opposed conical surfaces, and means urging said flanges axially toward each other with a force substantially proportional to the net tangential force between said flanges and said belt in all of said selected positions of said belt relative to said flanges, said means urging said flanges toward each other including control members having opposed control surfaces, said control members being rotatable relative to each other, one of said members being connected to one of said flanges of said pulley for movement therewith and another of said members being connected to a rotary input member, roller assemblies each including a plurality of rolling elements rotatable independently of each other on radially extending axes intersecting the axis of said pulley and disposed between and in engagement with said surfaces to move said members axially apart on relative rotation of said members to move said flanges of said pulley axially relative to each other and against said belt with a force substantially proportional to the tangential force of said belt.

2. The variable ratio pulley of claim 1 wherein said roller assemblies each include a plurality of cylindrical roller elements disposed adjacent to each other and rotatable independently of each other.

3. The variable ratio pulley of claim 2 and further comprising a laminar spring having fingers acting independently of each other on each of said roller elements to urge the latter into engagement with said opposed control surfaces.

4. The variable ratio pulley of claim 1 wherein said means urging said flanges axially toward each other includes a first control member connected for rotation with a shaft and having oppositely facing first control surfaces, a pair of second control surfaces disposed at opposite sides of said first control member and having second control surfaces facing said first control surfaces, said second control members being rotatable relative to said first control member and being rotatable with the flanges of said pulley, said roller assemblies being rolling means disposed at opposite sides of said first control member and in rolling engagement with adjacent control surfaces to move said second control members axially apart on rotation relative to said first member to move said flanges of said pulley axially relative to each other and against said belt with a force substantially proportional to the tangential force of said belt.

5. The variable ratio pulley of claim 1 wherein said rolling elements in each roller assembly are of the same diameter and wherein the radially outer rolling elements move in a longer circumferential path than the radially inner rolling elements on relative rotation of said control members.

6. The variable ratio pulley of claim 1 wherein said means urging said flanges towards each other includes a first set of control members having opposed control surfaces, a second set of control members having opposed control surfaces, means connecting said first set of control members to said flanges for rotation therewith and for application of torque in only one direction of rotation of said pulley and connecting said second set of control members for rotation with said flanges and application of torque only in the other direction of rotation of said pulley, first and second rolling means disposed between said control surfaces of said first and second sets of control members and being operative to move said flanges, said flanges being movable towards each other by said first rolling means upon application of torque to said pulley in one direction and by the other of said rolling means upon application of torque to said pulley in the opposite direction.

7. The variable ratio pulley of claim 6 and further comprising means disposed between said first and second sets of control members to move said sets of control member circumferentially relative to each other in response to movement of one of said sets.

8. The variable ratio pulley of claim 7 wherein said means includes gear means moving said first and second control member circumferentially through an equal arc relative to each other.

9. The variable ratio pulley of claim 6 wherein said first and second sets of control members are spaced radially relative to each other.

10. The variable ratio pulley of claim 1 wherein said ratio control means includes a control spool rotatable about an axis parallel to the axes of said pulley and having opposed control flanges simultaneously engagable with said pulley flanges to move said pulley flanges axially towards each other whereby said belt moves to a greater pitch radius.

11. The variable ratio pulley of claim 1 wherein said ratio control means includes a control roller rotatable about an axis parallel to the axis of said pulley and having opposed control surfaces substantially tangent to the surfaces of said pulley flanges, said control roller being supported for radial inward movement between the flanges of said pulley to force them apart and cause the belt to seek a smaller circular path between said flanges.

12. The variable ratio pulley of claim 10 and further comprising means resiliently urging said control flanges of said spool toward each other to urge said pulley flanges toward each other.

13. A variable ratio belt drive comprising: a pair of pulleys, each of said pulleys comprising a pair of disc-shaped flanges supported coaxially of each other for rotation as a unit and for movement axially relative to each other, said flanges having conical surfaces converging relative to each other radially inwardly, a transmission belt extending around each of said pulleys between said flanges and extending substantially tangentially toward and away from said pulleys, pitch control means for moving said flanges of one of said pulleys axially to selected positions relative to each other to change the pitch radius at which said belt engages said opposed conical surfaces of said one pulley, and means acting on each of said pulleys and resiliently urging said flanges of each of said pulleys axially towards each other with a force substantially proportional to the net tangential force between said flanges and said belt in all of said selected positions of said belt relative to said flanges, said pitch control means including a control member rotatable about an axis parallel to the axes of said pulleys and having opposed control surfaces engageable with the flanges of a selected one of said pulleys to force said flanges axially and change the radial position of said belt between the flanges of both pulleys.

14. The variable ratio belt drive of claim 13 wherein said pitch control means includes a control member rotatable about an axis parallel to the axes of said pulleys and having opposed control surfaces simultaneously engageable with the flanges of a selected one of said pulleys to force said flanges axially and change the radial position of said belt between the flanges of both pulleys.

15. The combination of claim 14 and further comprising a second control member substantially identical to said first named control member and being mounted on an axis parallel to the axis of said first control member, said control members being supported for inward radial movement of one control member simultaneously with the outward movement of the other control member to decrease the spacing of the flanges of the first pulley and permit the increase spacing of the flanges of the other pulley to change the speed ratio between said pulleys.

16. The variable ratio belt drive of claim 13 wherein the flanges of each of said pulleys are both movable axially in opposite directions a like amount upon a change in ratio whereby said belt remains in the same plane during a change in ratio.

17. The variable ratio drive of claim 13 and further comprising drive means for one of said pulleys and friction means operative to engage and retard rotation of said pulley upon a change in direction of rotation.

18. The variable ratio belt drive of claim 13 wherein said transmission belt is transversely resilient.

19. The variable ratio belt drive of claim 13 wherein said transmission belt is substantially rigid transversely and wherein said conical surfaces are coated with rubberlike material.

20. The variable ratio belt drive of claim 13 wherein said control member is a spool having opposed flanges forming said opposed control surfaces, said opposed control surface being engageable with opposed outer surfaces of said flanges of a selected one of said pulleys to force said flanges toward each other to move said belt to a greater pitch radius.

21. The variable ratio belt drive of claim 20 and further comprising means resiliently urging said opposed flanges of said spool toward each other.

22. The variable ratio belt drive of claim 20 wherein said flanges of said spool are profiled to maintain a substantially fixed proximity with one of the pulleys while engaging and modifying the driving ratio of the other of said pulleys.

23. A variable ratio pulley for a belt drive comprising: a pair of disk-shaped flanges supported coaxially to each other for rotation as a unit and for movement axially relative to each other, said flanges having conical surfaces converging relative to each other radially inwardly and adapted to receive a transmission belt therebetween extending around and tangentially toward and away from said flanges, ratio control means for moving said flanges axially to selected positions relative to each other to change the pitch radius at which said belt engages said opposed conical surfaces, and means urging said flanges axially toward each other with a force substantially proportional to the net tangential force between said flanges and said belt in all of said selected positions of said belt relative to said flanges, said means urging said flanges toward each other including control members having opposed control surfaces, said control members being rotatable to each other, one of said members being connected to one of said flanges of said pulley for movement therewith and another of said members being connected to a rotary input member, generally cylindrical rollers rotatable on radially extending axes intersecting the axis of said pulley and disposed between and in engagement with said surfaces to move said members axially apart on relative rotation of said members to move said flanges of said pulley axially relative to each other and against said belt with a force substantially proportional to the tangential force of said belt, said pair of flanges being fixed on a pair of concentric shafts, respectively, said shafts being movable axially to each other, longitudinally extending flat surfaces formed on facing portions of said concentric shafts, and rolling means between said facing flat surfaces to maintain said shafts and flanges connected together for unitary rotation and permitting axial movement of said shafts.

24. A variable ratio pulley for a belt drive comprising: a pair disk-shaped flanges supported coaxially of each other for rotation as a unit and for movement axially relative to each other, said flanges having conical surfaces converging relative to each other radially inwardly and adapted to receive a transmission belt therebetween extending around and tangentially toward and away from said flanges, ratio control means for moving said flanges axially to selected positions relative to each other to change the pitch radius at which said belt engages said opposed conical surfaces, means urging said flanges axially toward each other with a force substantially proportional to the net tangential force between said flanges and said belt in all of said selected positions of said belt relative to said flanges, said means urging said flanges toward each other including control members having opposed control surfaces, said control members being rotatable relative to each other, one of said members being connected to one of said flanges of said pulley for movement therewith and another of said members being connected to a rotary input member, generally cylindrical rollers rotatable on radially extending axes intersecting the axis of said pulley and disposed between and in engagement with said surfaces to move said members axially apart on relative rotation of said members to move said flanges of said pulley axially relative to each other and against said belt with a force substantially proportional to the tangential force of said belt, said pair of flanges being supported on inner and outer concentric shafts, respectively, said belt resulting in a high radial load and a lower radial load at diametrically opposite sides of said concentric shafts during rotation thereof, said concentric shafts each forming facing, longitudinally extending flat surfaces spaced circumferentially around the axes of said shafts, rolling means between said facing flat surfaces to transmit rotational movement between said concentric shafts and being rotatable axially of said shafts during relative axial movement of said shafts, and spring means acting axially of said shafts at opposite sides of said rolling means to move said rolling means to their initial position when said shafts are subject to said lower radial loading.

25. A variable ratio pulley for a belt-drive comprising: a pulley having a pair of flanges mounted on inner and outer concentric shafts, respectively, a drive belt between said flanges resulting in a high radial load and a lower radial load at diametrically opposite sides of said shafts during rotation thereof, said concentric shafts each forming facing, longitudinally extending flat surfaces circumferentially spaced about the axes of said shafts, rolling means between said facing surfaces to transmit rotational movement between said concentric shafts and being movable axially of said shafts from a predetermined position during relative axial movement of said shafts, spring means acting axially of said shaft at opposite sides of said rolling means to permit axial movement of rolling means when the latter are at high loading between shafts and return of said rolling means to said predetermined position when said shafts are subject to a said lower radial loading.

26. A variable ratio belt drive according to claim 25 wherein said rolling means are rollers rotatable about axes transversed to said shafts.

27. The variable ratio belt drive of claim 25 wherein said belt maintains a high loading on said concentric shafts at one position and a lower loading at a diametrically opposed position and wherein springs act axially of said shafts at opposite ends of the path of said rolling means to permit movement of said rolling means under said maximum load and to cause return movement to the initial position under said low load.

28. A variable ratio belt drive comprising: a pair of pulleys, each of said pulleys comprising a pair of disk-shaped flanges supported coaxially of each other for rotation as a unit and for movement axially relative to each other, means urging said flanges of each pulley axially towards each other with a force substantially proportional to the net tangential force between said flanges of said belt in all of said selected positions of said belt relative to said flanges, said means urging said flanges of each of said pulleys towards each other including control members having opposed control surfaces, said control members of each of said pulleys being rotatable relative to each other, one of said members being connected to one of said flanges of each of said pulleys for movement therewith and the other of said control members of one pulley being connected to a rotary input member and the other of said control members of the other of said pulleys being connected to a rotary output member, roller assemblies associated with each of said pulleys, each of said roller assemblies including a plurality of rolling elements rotatable independently of each other on axes extending radially and intersecting the axis of the associated one of said pulleys and disposed between and in engagement with said surfaces to move said members axially apart upon relative rotation of said members to move said flanges of said pulleys axially relative to each other and against said belt with a force substantially proportional to the tangential force of said belt.

29. The variable ratio belt drive of claim 28 and further comprising driving means and driven means, free wheeling means connected between one of said driving or driven means and the associated one of said pulleys whereby torque can be transmitted from said driving means to said driven means but not in the reverse direction.

* * * * *